(12) United States Patent
Matsuda (10) Patent No.: US 10,372,750 B2
(45) Date of Patent: Aug. 6, 2019

(54) INFORMATION PROCESSING APPARATUS, METHOD, PROGRAM AND STORAGE MEDIUM

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 15/420,556

(22) Filed: Jan. 31, 2017

(65) Prior Publication Data

US 2017/0235728 A1    Aug. 17, 2017

(30) Foreign Application Priority Data

Feb. 12, 2016  (JP) ................................. 2016-025191

(51) Int. Cl.
| | |
|---|---|
| *G06F 17/30* | (2006.01) |
| *G06F 16/51* | (2019.01) |
| *G06K 9/00* | (2006.01) |
| *G06T 7/00* | (2017.01) |
| *G06F 16/583* | (2019.01) |

(52) U.S. Cl.
CPC .......... *G06F 16/51* (2019.01); *G06F 16/5854* (2019.01); *G06K 9/00228* (2013.01); *G06K 9/00288* (2013.01); *G06K 9/00664* (2013.01); *G06T 7/0002* (2013.01)

(58) Field of Classification Search
CPC .................................................. G06F 17/3028
See application file for complete search history.

(56) References Cited

U.S. PATENT DOCUMENTS

| | | | |
|---|---|---|---|
| 2004/0174434 A1* | 9/2004 | Walker .............. | G06F 17/30265 348/211.3 |
| 2010/0048242 A1* | 2/2010 | Rhoads ............. | G06F 17/30244 455/556.1 |

FOREIGN PATENT DOCUMENTS

| | | | | |
|---|---|---|---|---|
| EP | 2557524 A1 * | 2/2013 | ......... | G06K 9/00228 |
| JP | 2005-6195 A | 1/2005 | | |

* cited by examiner

*Primary Examiner* — Syed H Hasan

(74) *Attorney, Agent, or Firm* — Venable LLP (57) ABSTRACT

The present invention provides a technique for, when there are multiple images, attaching an appropriate (neither too large nor too small) number of tags to each image. An information processing apparatus of an embodiment of the present invention includes: a processor; and a memory storing a program which, when executed by the processor, causes the information processing apparatus to: detect a subject from each of a plurality of images; determine a tag corresponding to the detected subject; calculate, for each image, a value based on an image quality of an area of the subject corresponding to the tag; select, based on the value calculated for each image, at least one of the plurality of images from which the subject corresponding to the tag is detected; and store the tag in association with the selected image.

9 Claims, 7 Drawing Sheets

INFORMATION PROCESSING APPARATUS, METHOD, PROGRAM AND STORAGE MEDIUM

BACKGROUND OF THE INVENTION

Field of the Invention

The present invention relates to an information processing apparatus, a program, a storage medium and a method for tagging a captured image.

Description of the Related Art

In recent years, for the purpose of selecting a desired image from a large number of images and classifying the images, a technique of attaching to an image metadata describing the contents of the image, as a tag, is used. For example, Japanese Patent Application Laid-Open No. 2005-6195 discloses a technique of attaching metadata, as tags, to an image.

An appropriate (neither too large nor too small) number of tags is desirably attached to an image. If an insufficient number of tags or inaccurate tags are attached to an image, the image cannot be accurately selected or reorganized. On the other hand, if too many tags are attached to an image, there is likelihood that the image cannot be accurately selected or reorganized even if the tags accurately describe the content of the image. This is because the excessive tagging increases the number of images from which the desired image is selected.

The technique disclosed in Japanese Patent Application Laid-Open No. 2005-6195 is such that: information is received from a wireless chip attached to a subject, and metadata on the subject is generated based on the received information and is attached to the image of the subject. However, the technique disclosed in Japanese Patent Application Laid-Open No. 2005-6195 cannot be applied to a subject to which no wireless chip is attached in advance. Furthermore, the technique disclosed in Japanese Patent Application Laid-Open No. 2005-6195 has been developed without considering to limit the number of tags, even though the technique is capable of increasing the accuracy of the tags by tagging based on the information received from the subject.

The present invention has been made with the foregoing situation taken into consideration. An object of the present invention is to provide a technique for, when there are multiple images, attaching an appropriate (neither too large nor too small) number of tags to each image.

SUMMARY OF THE INVENTION

An information processing apparatus of a first aspect of the present invention includes: a processor; and a memory storing a program which, when executed by the processor, causes the information processing apparatus to: detect a subject from each of a plurality of images; determine a tag corresponding to the detected subject; for each image, calculate a value based on an image quality of an area of the subject corresponding to the tag; based on the value calculated for each image, select at least one of a plurality of images from which the subject corresponding to the tag is detected; and store the tag in association with the selected image.

A method of controlling an information processing apparatus of a second aspect of the present invention includes the steps of: detecting a subject from each of a plurality of images; determining a tag corresponding to the detected subject; calculating, for each image, a value based on an image quality of an area of the subject corresponding to the tag; selecting, based on the value calculated for each image, at least one of a plurality of images from which the subject corresponding to the tag is detected; and storing the tag in association with the selected image.

The present invention can provide a technique for, when there are multiple images, adding an appropriate (neither too large nor too small) number of tags to each image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Components of the embodiment are described only for the purpose of showing examples. The scope of the invention shall not be construed as being limited by the components.

Embodiment

Figure 1:
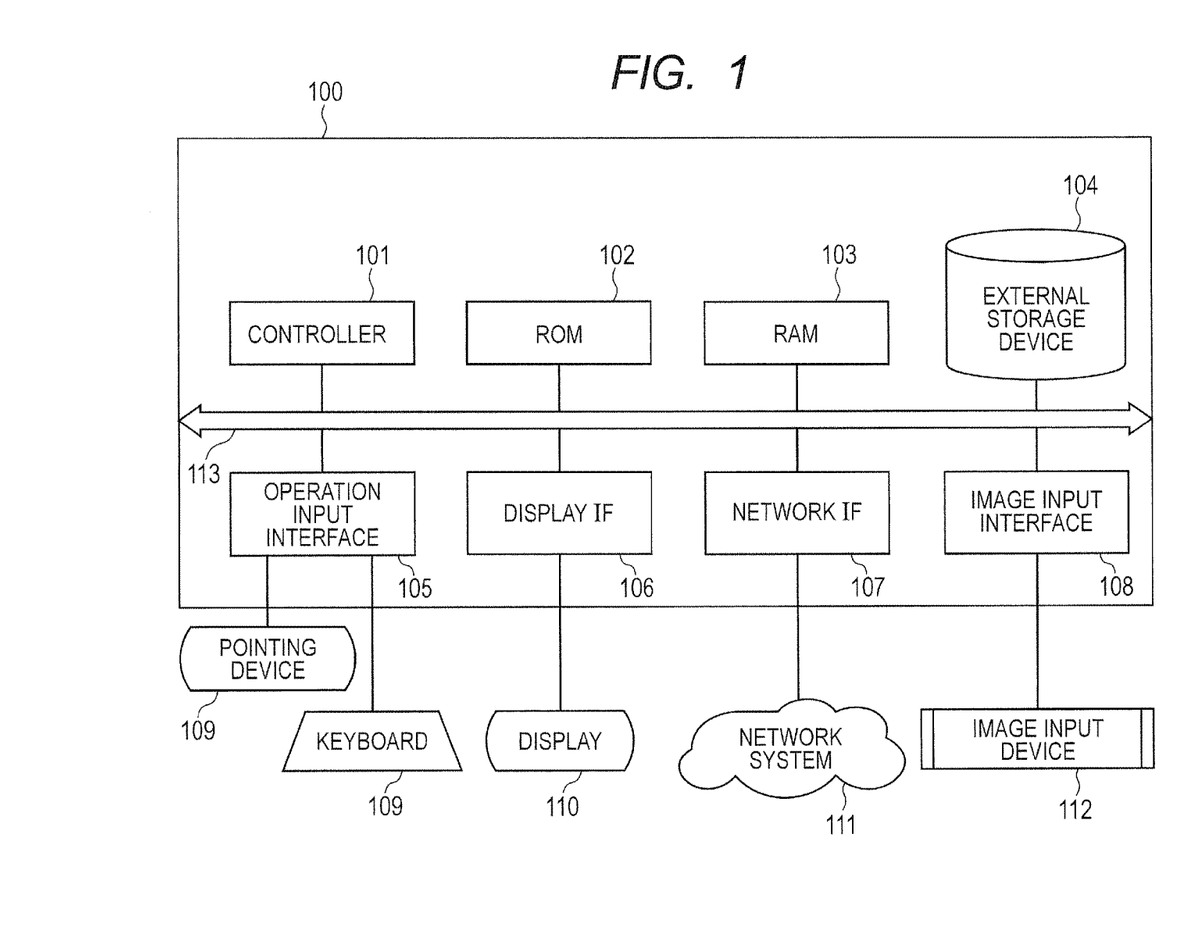
FIG. 1 is a block diagram illustrating a configuration of a tagging apparatus of an embodiment.

Detailed descriptions will be hereinbelow provided for an embodiment of the present invention based on the drawings. FIG. 1 is a block diagram illustrating a configuration of an information processing apparatus for implementing a tagging apparatus 100 of the embodiment. The tagging apparatus 100 may be implemented using one computer, or multiple computers assigned functions, depending on the necessity. In the case where the tagging apparatus 100 is formed from the multiple computers, the computers are connected together via a local area network (LAN) or the like to allow communications among the computers.

The tagging apparatus 100 includes: a controller 101; a read only memory (ROM) 102; a random access memory (RAM) 103; an external storage device 104; an operation input interface 105; a display interface 106; a network interface 107, and an image input interface 108. The components included in the tagging apparatus 100 are connected together by a system bus 113 to allow communications among the components. The controller 101 is a control unit for controlling the entirety of the tagging apparatus 100, and for example, is a central processing unit (CPU). The ROM 102 is a ROM for storing programs and parameters which need not be modified. The RAM 103 is a RAM for temporarily storing programs and data which are supplied from external devices and the like. The external storage device 104 is an external device arbitrarily selected from: storage media such as a hard disk and a flash memory which are fixedly set in the tagging apparatus 100; and portable storage media such as optical disks (a Floppy™ disk (FD) and a compact disk (CD), for example), a magnetic card, an optical card and an IC card which are detachably attached to the tagging apparatus 100. The operation input interface 105 is an interface between the tagging apparatus 100 and input devices 109 such as a pointing device and a keyboard for inputting data. The display interface 106 is an interface between the tagging apparatus 100 and a display 110 for displaying data held by or supplied to the tagging apparatus 100. The network interface 107 is a network interface for connecting the tagging apparatus 100 to a network system 111 such as the Internet. The image input interface 108 is an interface for enabling the tagging apparatus 100 to make communications with an image input device 112 such as an image capturing apparatus. The configuration of the tagging apparatus 100 is not limited to one shown in FIG. 1. The tagging apparatus 100 may further include arbitrary members and devices.

Figure 2A:
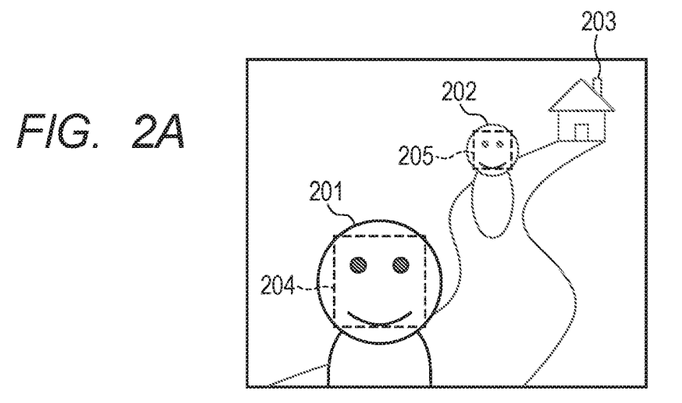
FIG. 2A is a diagram illustrating a target image to be processed by the tagging apparatus of the embodiment.
Figure 2B:
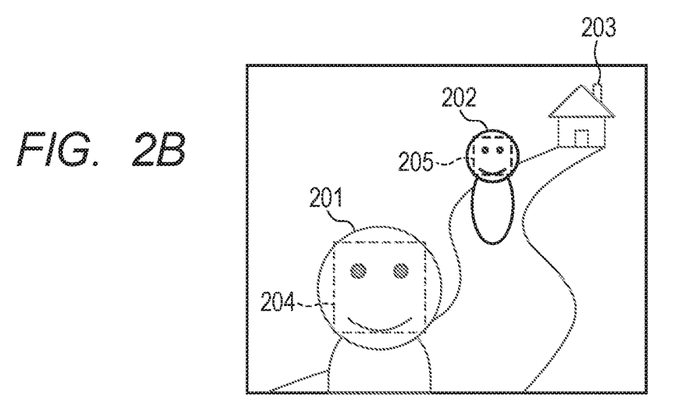
FIG. 2B is a diagram illustrating a target image to be processed by the tagging apparatus of the embodiment.
Figure 2C:
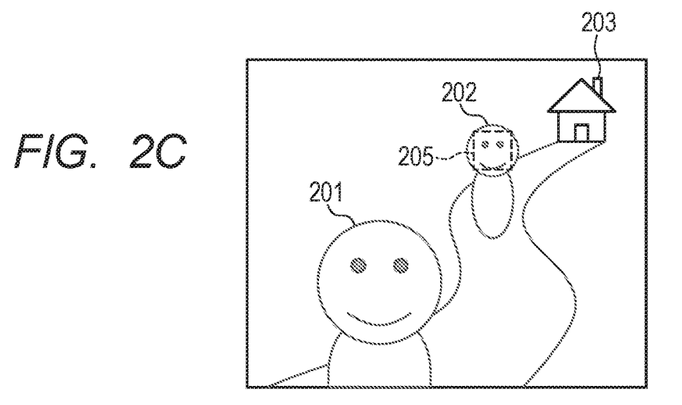
FIG. 2C is a diagram illustrating a target image to be processed by the tagging apparatus of the embodiment.

FIGS. 2A to 2C are diagrams illustrating exemplary target images to be processed by the tagging apparatus 100 of the embodiment. The target images are three images which are captured in succession using a focus bracketing photography technique, or by changing the focal length from the near side to the far side. As objects, a person 201, a person 202 and a building 203 are captured into each image. Focus points (or points in focus) in the images shown in FIGS. 2A, 2B and 2C are the person 201, the person 202 and the building 203, respectively. In FIGS. 2A to 2C, areas in focus are depicted with clear lines, which areas out of focus are depicted with blurry lines.

Figure 3:
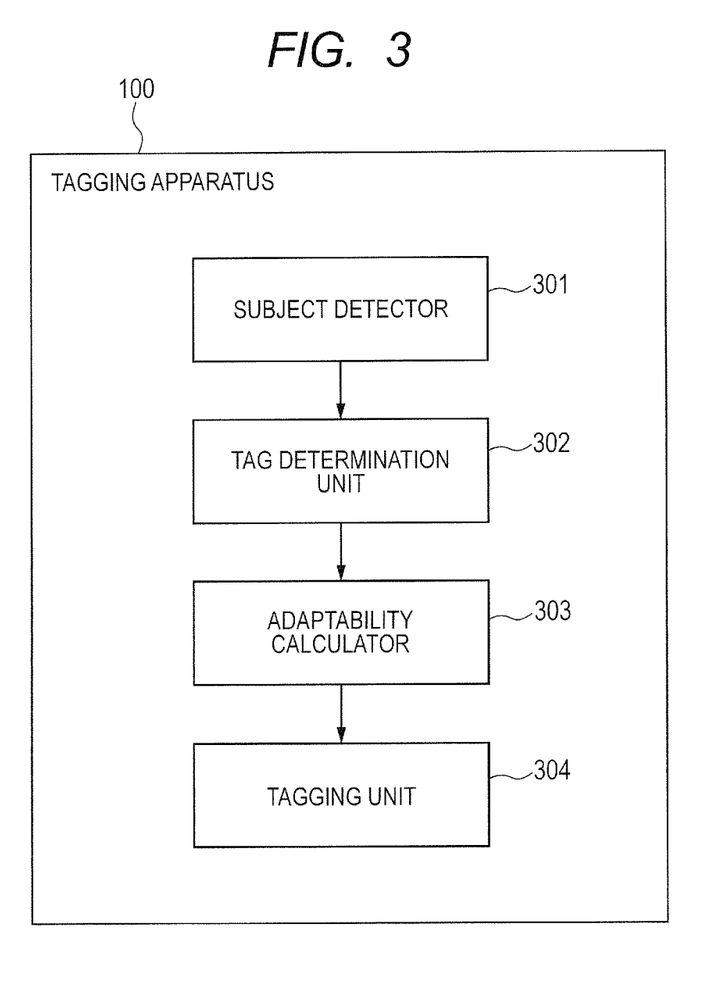
FIG. 3 is a block diagram illustrating functions of the tagging apparatus of the embodiment.

FIG. 3 is a block diagram illustrating functions of the tagging apparatus 100 of the embodiment. In FIG. 3, arrows indicate the main data flow. There may be data flows which are different from the main data flow shown in FIG. 3. In FIG. 3, each block represents a functional unit configuration, but not a hardware (apparatus) unit configuration. In addition, each block may be divided into sub-blocks. The functions of the tagging apparatus 100 are not limited to those shown in FIG. 3. The tagging apparatus 100 may further include arbitrary functions.

The tagging apparatus 100 includes: a subject detector 301 as subject detection means; a tag determination unit 302 as tag determination means; an adaptability calculator 303 as calculation means; and a tagging unit 304 as tagging means. The controller 101 of the tagging apparatus 100 (CPU) fulfils the functions represented by the blocks shown in FIG. 3 by reading the programs recorded in the ROM 102 or the external storage device 104 out to the RAM 103 and executing the programs.

The subject detector 301 detects subjects which can be tagged from each target image. As a result of the detection, the subject detector 301 detects a facial area 204 of the person 201 and a facial area 205 of the person 202 in the images shown in FIGS. 2A and 2B. The subject detector 301 detects the facial area 205 of the person 202 in the image shown in FIG. 2C. In FIG. 2C, a reason why the facial area of the person 201 is not detected as a subject which can be tagged is that the facial area blurs to a great extent. In addition, in all of FIGS. 2A to 2C, a reason why the building 203 is not detected as a subject which can be tagged is that regardless of the image capturing conditions, the subject detector 301 does not determines that the building 203 is a subject which can be tagged. The subject detector 301 may be configured to determine that a predetermined object, which is something other than a facial area of a person such as a building, an animal, and a scenic place, in an image is a subject. A well-known technique may be used to determine an object from an image.

Figure 4A:
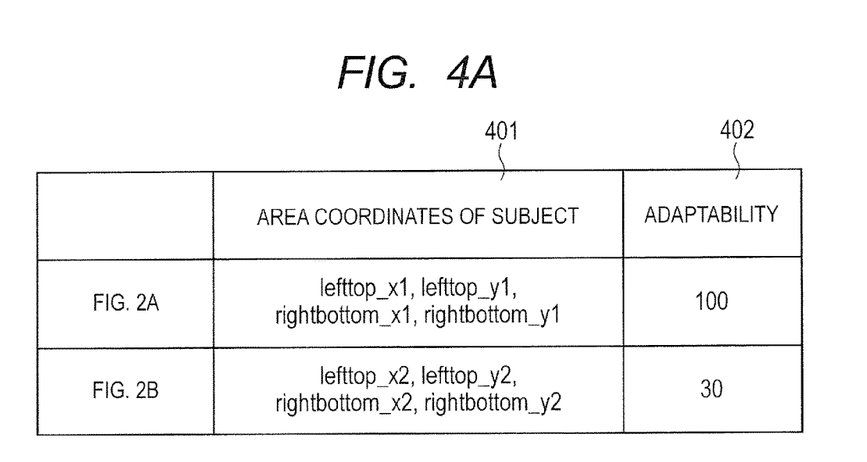
FIG. 4A is a diagram illustrating results of a tag determination to be made by the tagging apparatus of the embodiment.
Figure 4B:
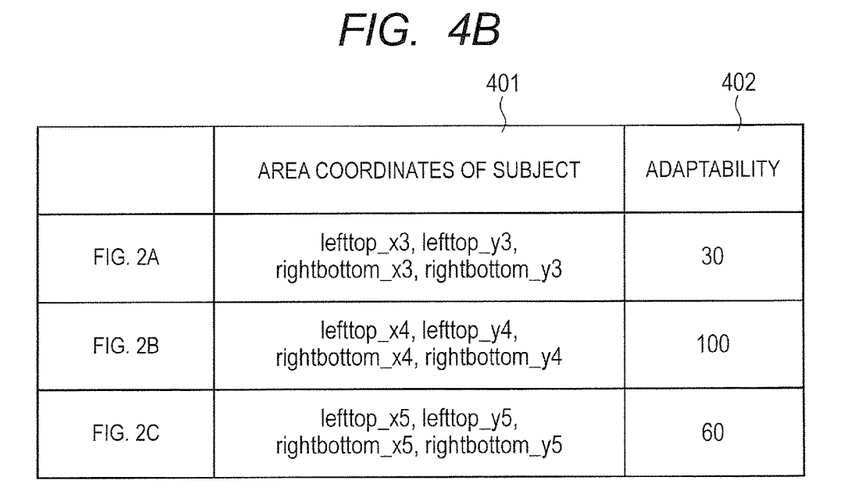
FIG. 4B is a diagram illustrating results of the tag determination to be made by the tagging apparatus of the embodiment.

Next, descriptions will be provided for the tag determination unit 302 for making a tag determination on the subject detected by the subject detector 301. In an area (a subject area) including the subject detected by the subject detector 301 from the target image, the tag determination unit 302 determines a tag associated with the subject. In this respect, for each tag, a feature amount of the subject is stored in the external storage device 104 in advance. Based on the feature amount of the subject area and the feature amount stored for each tag, the tag determination unit 302 determines the tag associated with the subject. For example, in a case where the subject is the face of a certain person, the feature amount of the face is stored in association with a tag representing the person in advance. The adaptability calculator 303 determines the adaptability of the subject. In this embodiment, the adaptability is information defined based on the image quality of the target image which is used as a criterion for determining whether the subject should be tagged. The tagging apparatus 100 of the embodiment calculates the adaptability based on a degree of blur of the subject area. The adaptability is defined such that: the less blurry the subject area becomes, the higher the adaptability of the subject area becomes; and the more blurry the subject area becomes, the lower the adaptability thereof becomes. FIGS. 4A and 4B are diagrams illustrating results of the tag determination obtained by the tag determination unit 302. Each result of the tag determination includes: coordinates information including area coordinates representing the location of the subject in the image; and the adaptability of the tag. FIG. 4A shows adaptabilities of "Person A" tags representing the person 201. FIG. 4B shows adaptabilities of "Person B" tags representing the person 202. In each of FIGS. 4A and 4B, a column "area coordinates 401" shows the area coordinates of the detected subject, while a column "adaptability 402" shows the adaptabilities of the tags (in this case, the "Person A" tags or the "Person B" tags) calculated for the subject. The subject area is a rectangular area in the target image, and defined by the abscissa (lefttop_x) and ordinate (lefttop_y) of the upper left point of the subject as well as the abscissa (rightbottom_x) and ordinate (rightbottom_y) of the lower right point of the subject. The definition of the subject area and the area coordinates are not limited to this example. The definition may be performed using an arbitrary method, as long as the arbitrary method serves the purpose of identifying an area for a tag attachment.

Next, the tag determination unit 302 may be further configured to make an identical subject determination on a subject, a tag associated with which the tag determination unit 302 has determined. The identical subject determination is a determination made on whether identical subjects are included in subject areas associated with the same tags detected by the tag determination unit 302 from multiple target images. Even if the tags are identical, there is a case where the multiple subject areas associated with the tags include different subjects. For this reason, when the identical subject determination is made, the accuracy with which such subject areas are tagged can be increased.

During the identicalness determination, in a case where subjects to which the same tag is assigned are present in multiple target images, the tag determination unit 302 calculates how much the subject areas overlap each other based on the area coordinates 401 of each subjects. For example, how much the subject areas overlap each other is calculated as the number of pixels having the same coordinates which are shared between the area coordinates 401 representing two subjects. In addition, in a case where the degree of how much the subject areas in the respective images having the same tag overlap each other is equal to or greater than a predetermined threshold value, the tag determination unit 302 determines that the areas represent the same subject which is shared between the multiple images. By this identical subject determination, it can be determined that the subjects, such as the facial area 204 and the facial area 205 illustrated in FIGS. 2A to 2C, existing respectively in the multiple images are identical to each other. Furthermore, during the identicalness determination, in a case where the degree of how much the subject areas in the respective images having the same tag overlap each other is less than the predetermined threshold value, the tag determination unit 302 determines that the areas respectively represent different subjects. This makes it possible to accurately distinguish between the different subjects even if the same tag has been assigned to the subjects.

For the identicalness determination of the embodiment, the identical subject determination is made based on whether the tag is identical, and how much the areas overlap each other. Nevertheless, the identical subject determination may be made based on only whether the tag is identical.

For each of the subjects which have been determined as being identical by the identicalness determination, the tagging unit 304 performs a tagging process for associating a tag with at least one target image based on the adaptability. Details of the tagging process will be hereinbelow described using FIGS. 6 and 7.

Figure 5:
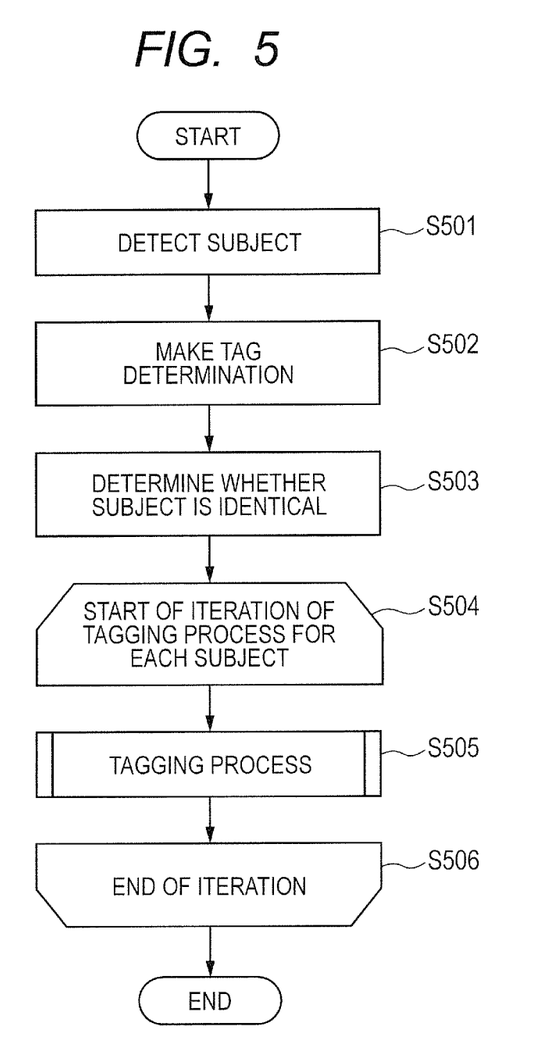
FIG. 5 illustrates a flowchart of a tagging method of the embodiment.
Figure 6:
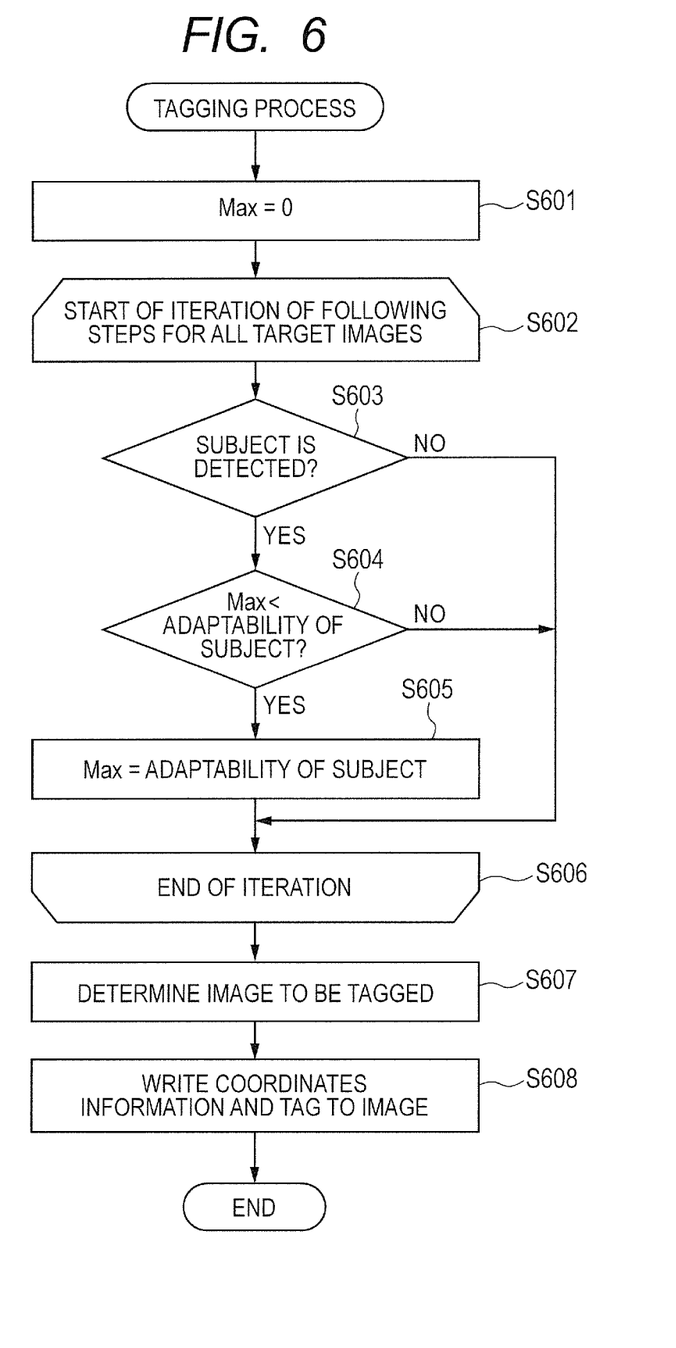
FIG. 6 illustrates a flowchart of tagging process of the embodiment.
Figure 7:
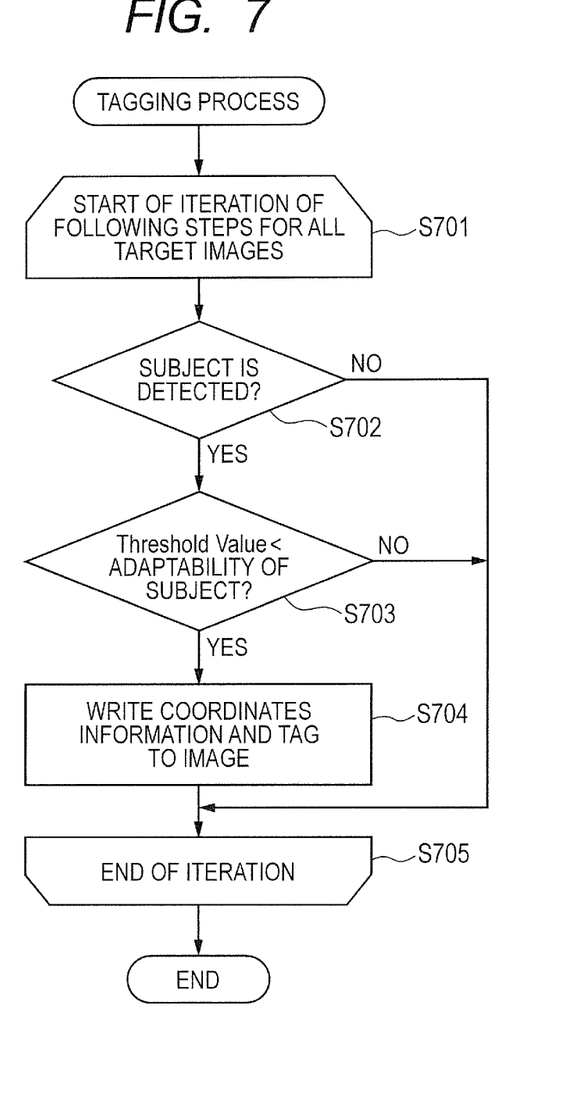
FIG. 7 illustrates a flowchart of the tagging process of the embodiment.

Next, descriptions will be provided for flows of the tagging process to be performed by the tagging apparatus 100 of the embodiment. FIGS. 5, 6 and 7 are diagrams illustrate flowcharts of a tagging method to be performed using the tagging apparatus 100. The following processes are implemented by the controller 101 of the tagging apparatus 100 executing the control program, the OS, the application program and the like which are stored in the ROM 102 or the external storage device 104, and controlling the components included in the tagging apparatus 100.

FIG. 5 illustrates an overall flowchart of the tagging method of the embodiment. To begin with, the subject detector 301 detects subjects which can be tagged from all of the target images (step S501). Thereafter, for each subject area detected in step S501, the tag determination unit 302 determines an applicable tag and its adaptability (step S502).

Using a result of the tag determination made in step S502, the tag determination unit 302 makes the above-discussed identical subject determination (step S503). Thereby, it is possible to determine which subject is identical among the multiple target images.

Steps S504 to S506 are iterated steps. In step S504, the iteration is started. For each subject determined as being identical in step S503, the tagging process in step S505 is performed. In step S506, the procedure proceeds to the next iteration. When the tagging process is completed for all the identical subjects, the iteration from steps S504 to S506 is terminated. A specific process in the tagging process of step S505 may be implemented using either the contents illustrated in FIG. 6 or in FIG. 7. The following descriptions will be provided for the tag assignment process illustrated in FIG. 6 and the tag assignment process illustrated in FIG. 7.

First, one example of the tagging process will be discussed using FIG. 6. FIG. 6 illustrates a flowchart of the tagging process included in the tagging method of the embodiment. The tagging process is performed on a particular subject. To begin with, the tagging unit 304 is initialized such that the maximum value of the adaptability is reset to 0 (step S601). Steps S602 to S606 are iterated steps for determining which image has the greatest adaptability. In step S602, the iteration is started. For each target image, the following process is performed. Using the results of the subject determination made by the subject detector 301, the tagging unit 304 determines whether the subject (or a subject for the current tagging process) has been detected from the target image (step S603). In the case where the subject has been detected, the procedure proceeds to step S604. In the case where no subject has been detected, steps S602 to S606 are iterated using the next set of target images.

From a result of the adaptability calculation made by the adaptability calculator 303, the tagging unit 304 obtains the adaptability of the subject in the target image. Thereafter, the tagging unit 304 compares the thus-obtained adaptability with the maximum value of the adaptability which is the largest among the adaptabilities of the subjects in the target images subjected to the preceding rounds of the iterated process (step S604). Incidentally, in the first iterated process, the maximum value of the adaptability is equal to the initial value set at 0. In a case where as a result of this comparison, the adaptability of the subject in the target image is greater than the maximum value of the adaptability, the tagging unit 304 stores the adaptability of the subject in the target image as a new maximum (step S605). In a case where the adaptability of the subject in the target image is less than the maximum value of the adaptability, the tagging unit 304 leaves the maximum value unchanged. Thereafter, in step S606, the procedure proceeds to the next iteration. When the iterated process from steps S602 to S606 is completed for all of the target images, the iteration of the process from steps S602 to S606 is terminated, and then the procedure proceeds to step S607.

Based on a result obtained from the iteration of the process from steps S602 to S606, the tagging unit 304 determines a target image, inclusive of a subject having the greatest adaptability, as an image to be tagged (step S607). Finally, the tagging unit 304 writes the coordinate information of the subject and the tag to the image to be tagged which has been determined in step S607 (step S608).

When the foregoing tagging process is performed on all of the subjects, the tag is made, for each subject which can be tagged, to be associated with an image including a subject whose adaptability is the greatest among the adaptabilities of the subjects in the multiple images. As a result, for example, the facial area 204 illustrated in FIG. 2A is tagged with "Person A," while the facial area 205 illustrated in FIG. 2B is tagged with "Person B."

Next, another example of the tagging process will be discussed using FIG. 7. FIG. 7 illustrates another flowchart of the tagging process included in the tagging method of the embodiment. The tagging process is performed on a particular subject. Steps S701 to S705 are iterated steps for tagging a subject area whose adaptability is greater than a threshold value. In step S701, the iteration is started. For each target image, the following process is performed. Using the results of the subject determination made by the subject detector 301, the tagging unit 304 determines whether the subject (or a subject for the current tagging process) has been detected from the target image (step S702). In the case where the subject has been detected, the procedure proceeds to step S703. In the case where no subject has been detected, the process is iterated from step S701 using the next set of target images.

From a result of the adaptability calculation made by the tag determination unit 302, the tagging unit 304 obtains the adaptability of the subject in the target image. Thereafter, the tagging unit 304 determines whether the thus-obtained adaptability is greater than the predetermined threshold value (step S703). In a case where the adaptability of the subject is greater than the threshold value, the tagging unit 304 writes the coordinate information on the subject, the tag and information on the adaptability scale to the target image (step S704). In a case where the adaptability of the subject is equal to or less than the threshold value, the tagging unit 304 writes nothing to the target image. The information on the adaptability scale is information on evaluation of the adaptability on a scale based on the value of the adaptability, for example, the classification of the adaptability on a scale from 1 to 5 in ascending order of the adaptability. This adaptability scale can be used for image selection and reorganization. For example, the adaptability scale can be employed to reorganize images which include subjects on the adaptability scale from 3 to 5. In step S704, the tagging unit 304 may be configured to write the adaptability itself, instead of the information on the adaptability scale, to the target image. In other words, the tagging unit 304 may use at least one of the adaptability itself and the information on the adaptability scale.

Thereafter, in step S705, the procedure proceeds to the next iteration. When the iteration of the process from steps S701 to S705 is completed for all of the target images, the iteration from steps S701 to S705 is terminated.

The thus-configured tagging apparatus 100 of the embodiment is capable of attaching an appropriate (neither too large nor too small) number of tags to each of the multiple captured images. To put it more specifically, the tagging apparatus 100 tags only images including subject areas which are less blurry (or whose adaptability is higher). For this reason, the tagging apparatus 100 can decrease a risk of tagging blurry images and the like which are not useful for the image selection and reorganization.

It should be noted that although the embodiment uses a group of images captured in succession using the focus bracketing as target images, the present invention according to the embodiment is applicable to a group of images of any type as long as a policy on determining the adaptability of each subject (or a criterion for determining the adaptability thereof) is established. The target images may be those which are captured in succession using other bracketing photography techniques by changing capturing settings other than the focal length. For example, the target images may be a group of images which are captured using an exposure bracketing (AEB) photography technique, or in succession by changing the exposure. In this case, the tag determination unit 302 may be configured to calculate the adaptability of a subject based on the distribution of luminance values of the corresponding subject area. Otherwise, the target images may be a group of images which are captured using an ISO sensitivity bracketing photography technique, or in succession by changing the ISO sensitivity. In this case, the tag determination unit 302 may be configured to calculate the adaptability of a subject based on an amount of noise in the corresponding subject area. Otherwise, the tag determination unit 302 may be configured to use a group of images, captured without using the bracketing, as the target images, and to calculate the adaptability of a subject person such that the larger the proportion of the area occupied by the subject person becomes, the higher the adaptability of the subject person becomes.

Instead, the tag determination unit 302 may be configured to change the policy on determining the adaptability (the criterion for determining the adaptability) based on the conditions of capturing a group of images to be used as target images. In this respect, the capturing conditions mean conditions under which the group of images is captured in succession. For example, the conditions under which a group of images are captured using the focus bracketing and the conditions under which a group of images are captured using the exposure bracketing are different from each other. The tag determination unit 302 may be configured to change the policy on determining the adaptabilities of the subjects between the group of images captured as target images using the focus bracketing and the group of images captured as target images using the exposure bracketing. In this case, for the group of images captured using the focus bracketing which are a part of the target images, the tag determination unit 302 may calculate the adaptabilities of the subject areas based on a degree of blur of the subject areas. Meanwhile, for the group of images captured using the exposure bracketing which are the other part of the target images, the tag determination unit 302 may calculate the adaptabilities of the subject areas based on the luminance values of the subject areas.

Moreover, the embodiment providing the present invention may be carried out as an image capturing apparatus which includes an image capturing unit as capturing means in addition to the units included in the foregoing tagging apparatus 100. The image capturing unit includes arbitrary elements such as lenses needed to capture images, and imaging elements. In this case, the image capturing apparatus may be configured such that once target images are determined from images captured by the image capturing unit, the images are tagged; or such that once load on the controller becomes lower than a certain value, the image are tagged.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-025191, filed Feb. 12, 2016, which is hereby incorporated by reference herein in its entirety.

What is claimed is:

1. An information processing apparatus comprising:
a processor; and
a memory storing a program which, when executed by the processor, causes the information processing apparatus to:
read a plurality of images which are captured in succession using a bracketing photography technique by changing parameters of a capturing setting;
detect a subject from each of the read images;
determine a tag corresponding to the detected subject;
calculate, for an area of the subject corresponding to the tag of each image, a value based on an image quality corresponding to a type of the capturing setting;
select, based on the value calculated for each image, at least one of the read images from which the subject corresponding to the tag is detected; and
store the tag in association with the selected image.

2. The information processing apparatus according to claim 1, wherein
the read images are a group of images captured in succession using a focus bracketing photography technique by changing parameters of a focal length, and
the value is calculated based on a degree of blur of the area of the subject.

3. The information processing apparatus according to claim 1, wherein
the read images are a group of images captured in succession using an exposure bracketing photography technique by changing parameters of exposure, and
the value is calculated based on a distribution of luminance values in the area of the subject.

4. The information processing apparatus according to claim 1, wherein
the plurality of images are a group of images captured in succession using an ISO sensitivity bracketing photography technique by changing parameters of ISO sensitivity, and
the value is calculated based on an amount of noise in the area of the subject.

5. The information processing apparatus according to claim 1, wherein from the read images from which the subject corresponding to the tag is detected, an image with a highest value or an image with the value greater than a threshold value is selected.

6. The information processing apparatus according to claim 1, wherein the tag corresponding to the detected subject is determined based on a feature amount of the area of the subject and a feature amount associated with the tag.

7. The information processing apparatus according to claim 1, wherein a tag is not stored in association with an image not selected.

8. A method of controlling an information processing apparatus, comprising the steps of:
reading a plurality of images which are captured in succession using a bracketing photography technique by changing parameters of a capturing setting;
detecting a subject from each of the read images;
determining a tag corresponding to the detected subject;
calculating, for an area of the subject corresponding to the tag of each image, a value based on an image quality corresponding to a type of the capturing setting;
selecting, based on the value calculated for each image, at least one of the read images from which the subject corresponding to the tag is detected; and
storing the tag in association with the selected image.

9. A non-transitory computer readable medium storing a program which causes an information processing apparatus to:
read a plurality of images which are captured in succession using a bracketing photography technique by changing parameters of a capturing setting;
detect a subject from each of the read images;
determine a tag corresponding to the detected subject;
calculate, for an area of the subject corresponding to the tag of each image, a value based on an image quality corresponding to a type of the capturing setting;
select, based on the value calculated for each image, at least one of the read images from which the subject corresponding to the tag is detected; and
store the tag in association with the selected image.

* * * * *